United States Patent [19]
Fitzpatrick et al.

[11] Patent Number: 5,671,328
[45] Date of Patent: Sep. 23, 1997

[54] METHOD AND APPARATUS FOR AUTOMATIC CREATION OF A VOICE RECOGNITION TEMPLATE ENTRY

[75] Inventors: Gregory P. Fitzpatrick, Ft. Worth; William J. Johnson, Flower Mound; Marvin L. Williams, Lewisville, all of Tex.

[73] Assignee: International Business Machines Corporation, Armonk, N.Y.

[21] Appl. No.: 998,286

[22] Filed: Dec. 30, 1992

[51] Int. Cl.$^6$ .................. G10L 5/06; G10L 9/00
[52] U.S. Cl. .......... 395/2.55; 395/2.4; 395/2.52; 395/2.6
[58] Field of Search .................. 395/2, 2.1–2.87; 381/36–53

[56] References Cited

U.S. PATENT DOCUMENTS

| | | | |
|---|---|---|---|
| 4,363,102 | 12/1982 | Holmgren et al. | 395/2 |
| 4,454,586 | 6/1984 | Pirz et al. | 395/2.54 |
| 4,489,435 | 12/1984 | Moshier | 381/43 |
| 4,797,929 | 1/1989 | Gerson et al. | 395/2.52 |
| 4,831,653 | 5/1989 | Katayama | 381/43 |

OTHER PUBLICATIONS

D. Cox, J. Gabbard and S. Zuponcic "Office Initialization Ongoing Progress Box" IBM Technical Disclosure Bulletin, vol. 34, No. 2, pp. 87–88, published Jul., 1991.

D. F. Colburn and D. L. Hurley "Automatic User Notification When an Event of Interest Occurs" IBM Technical Disclosure Bulletin, vol. 34, No. 1, pp. 193–195, published Jun., 1991.

C. Kasiraj and T. J. Wolf "Generalized Even–Driven Finite State Machine Management" IBM Technical Disclosure Bulletin, vol. 32, No. 6A, pp. 83–84, published Nov., 1989.

A. Peters and M. Sehorne "Application–Initiated Multitasking and Queued Task Recognition" IBM Technical Disclosure Bulletin, vol. 31, No. 10, pp. 355–356, published Mar., 1989.

K. P. McGlynn "Test Case Generator" IBM Technical Disclosure Bulletin, vol. 27, No. 5, pp. 3153–3155, published Oct., 1984.

*Primary Examiner*—Tariq R. Hafiz
*Attorney, Agent, or Firm*—Norman L. Gundel

[57] ABSTRACT

A method and data processing system are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

10 Claims, 4 Drawing Sheets

5,671,328

METHOD AND APPARATUS FOR AUTOMATIC CREATION OF A VOICE RECOGNITION TEMPLATE ENTRY

BACKGROUND OF THE INVENTION

1. Field of the Invention

The present invention relates to data processing systems that are capable of voice recognition and in particular to the automated creation of a voice recognition template.

2. Description of the Related Art

Many data processing systems are capable of voice recognition. Such systems are able to recognize certain sounds and accept those sounds as inputs. Such systems may include one or more templates correlating sounds to inputs, such as keystrokes.

Each template may include a number of entries containing configured sounds. Such sounds may also be called voice recognition criteria components. For each voice recognition criteria component in a template entry, the template entry includes an associated macro and may include an associated comment string. The macro may be a keystroke or a command or a sequence of keystrokes or commands that are automatically input to the data processing system upon recognition of an associated voice recognition criteria component that is registered in the template. A comment string may also be associated with the voice recognition criteria component. The comment string may be a visual representation of the voice recognition criteria component or may describe the actions of the associated macro.

Voice recognition systems can be resource intensive in their need for memory and storage. In a data processing system with limited hardware resources, the number of separate voice recognition components that can be contained in one template may be limited. Multiple templates may be provided to increase the number of separate voice recognition criteria components that the data processing system may recognize. Related voice recognition criteria components may be grouped into specific templates. Thus, one or more templates may be used for one specific data processing application whereas other templates are used with other data processing applications. A person using the data processing system, called a user, may select a template to be active on the data processing system at any particular moment.

A template may include simple, or "atomic" macros. The user may execute complicated commands by voicing a sequence of voice recognition criteria components, thereby invoking a sequence of atomic macros. However, the invocation of a sequence of atomic macros, each with its own separate voice recognition criteria component, inhibits efficiency. More complex macros that are specifically tailored to the commands most frequently invoked by the user would be more efficient.

There is therefore a desire for automatic creation of voice template entries for frequently used complex commands, to enhance input efficiency. There is a desire to create voice template entries that are useful and have been repeatedly used. There is a desire to allow the creation of various types of complex voice template entries from atomic voice template entries.

SUMMARY OF THE INVENTION

In accordance with the present invention, a method and data processing system are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
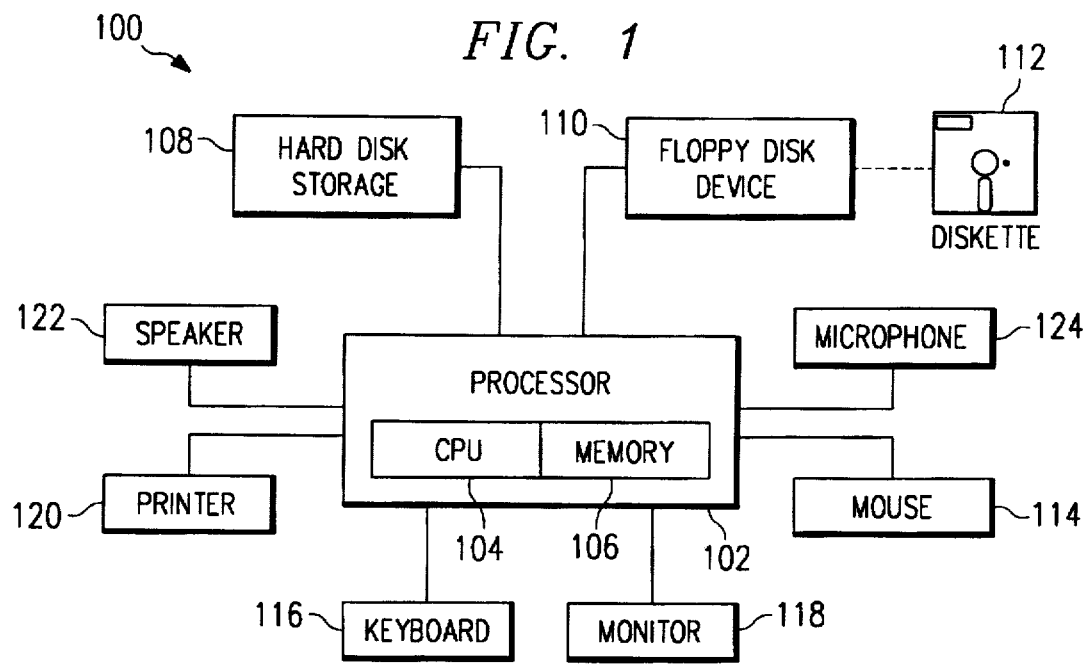
FIG. 1 is a block diagram of a data processing system used in performing the method of a preferred embodiment of the present invention and forming a part of the apparatus of a preferred embodiment of the present invention.

With reference now to the figures, and in particular with reference to FIG. 1, there is shown, in block diagram form, a data processing system 100 according to the present invention. The data processing system 100 includes a processor 102, which includes a central processing unit (CPU) 104 and memory 106. Additional memory, such as a hard disk file storage 108 and a floppy disk device 110, may be connected to the processor 102. Floppy disk device 110 may receive a removable diskette 112 which may have computer program code recorded thereon that implements the present invention in the data processing system 100. The data processing system 100 also includes user interface hardware, such as a mouse 114, a keyboard 116 and a microphone 124, for allowing user input to the processor 102. The data processing system 100 also includes a display, such as a monochrome or color display monitor 118 and a monochrome or color display printer 120, for presenting visual information to the user. The data processing system may also include a speaker 122 for presenting audio information to the user.

With reference now to FIGS. 2–5, there is depicted a high level flowchart which illustrates the method of a preferred embodiment of the present invention. This invention uses voice templates, but adds an additional attribute, called a conglomeration attribute, to the template. Thus, each separate voice recognition criteria component of the template has associated with it a conglomeration attribute as well as a macro and an optional comment string. Permissible values for the conglomeration attribute include START, END, and NONE.

In operation, the invention will assemble complex macros from simpler macros in an existing voice template. The assembled macros will commence with a macro having a conglomeration attribute of START and will terminate with a macro having a conglomeration attribute of END. Intervening macros, if any, may have a conglomeration attribute of either START or NONE.

The invention also assembles a voice recognition criteria component for each complex macro created. This voice recognition criteria component may be a concatenation of the separate voice recognition criteria components of the simpler macros from which the complex macro was created. Similarly, a comment string may be created by concatenating the comment strings of the simpler macros, and the conglomeration attribute is set to the default value of NONE.

The invention also comprehends the provision of a template editor to allow the substitution of user specified voice recognition criteria components and comment strings for the concatenated voice recognition criteria components and comment strings created by the invention. The template editor also allows the user to modify the conglomeration attribute from its default value of NONE.

Figure 3:
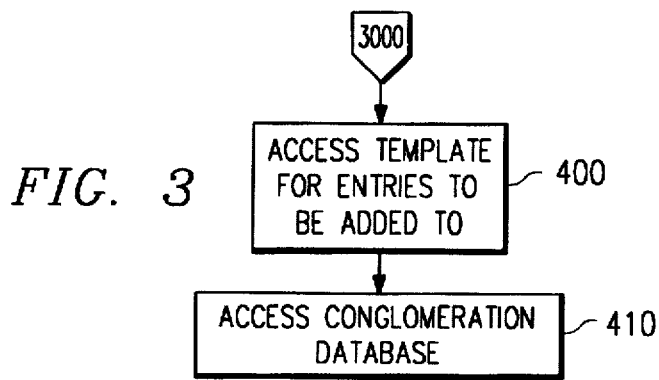
FIGS. 2–3 are a high level logic flowchart illustrating the method of a preferred embodiment of the conglomeration process of the present invention.
Figure 2:
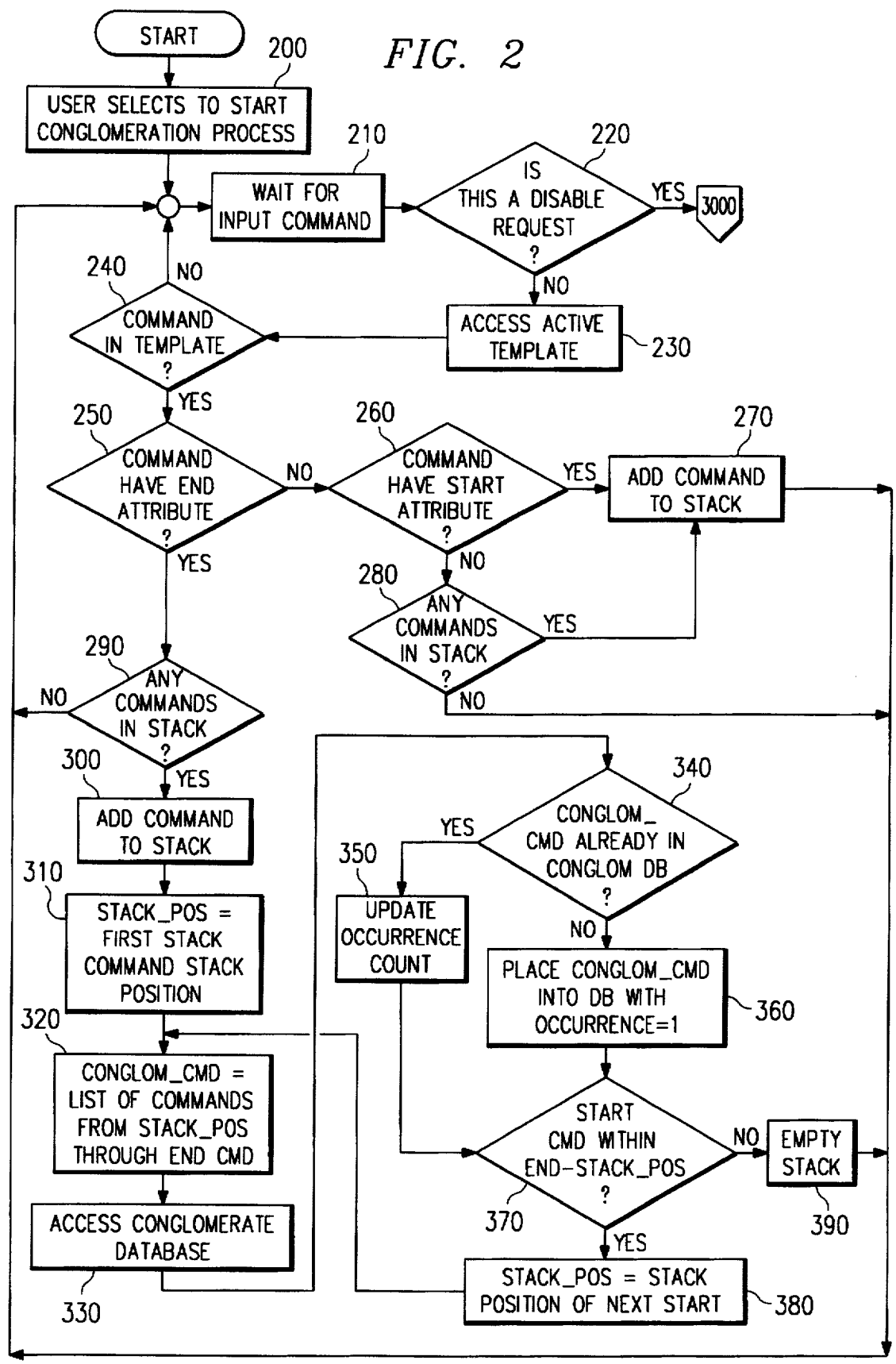

With reference now to FIGS. 2 and 3, there is depicted a high level logic flowchart which illustrates the conglomeration process of the present invention. The conglomeration process creates conglomerated complex voice template entries from less complex active template entries. Preferably, the process is initiated while the data processing system and its voice recognition component are active. Turning first to FIG. 2, the process begins at block 200 upon receipt of a user command to START the conglomeration process. The process operates concurrently with the underlying application or applications in which the user is operating. The process proceeds from block 200 to block 210 and monitors user input commands. Upon receipt of a command, such as a keystroke command or a voice command which is converted to keystroke commands, the process proceeds from block 210 to block 220 and determines whether the command received is a request to disable or terminate the conglomeration process. Such a command may be specific to the conglomeration process or may be encompassed within a command to, for example, terminate an underlying application. If a disable request is received, the process proceeds to off-page connector 3000 of FIG. 3, discussed below. If it is determined that the command is not a disable request, the process proceeds from block 220 to block 230 in which the active template of the voice processing component is accessed. The process then proceeds, to block 240 where it is determined whether the received command is registered with the active template. If not, the process returns to block 210, described above.

In accordance with this invention, as described above, the active template includes the various voice recognition criteria components that have been registered to the template. Each such component is associated with not only a macro and an optional comment string but also a conglomeration attribute. Such conglomeration attribute may be either START, END, or the default, which is NONE.

Returning to block 240, if the voice recognition criteria component for the input command is found in the active template, the process proceeds from block 240 to block 250.

At block 250 it is determined whether the conglomeration attribute associated in the active template with the voice recognition criteria component found is END. If not, the process proceeds from block 250 to block 260 for a determination of whether the conglomeration attribute associated with the voice recognition criteria component found is START. If so, the process proceeds from block 260 to block 270 and adds the command to a stack of commands. The stack retains commands received by the data processing system, in the order that the commands were entered. As will be seen, the commands retained by the stack include any START type commands and any subsequent commands received until an END type command is received and added to the stack. The process then proceeds from block 270 to block 210 to wait for another input command.

Returning to block 260, if it is determined that the conglomeration attribute associated in the active template with the voice recognition criteria component for the input command is not START, which implies that it is NONE, the process proceeds to block 280 for a determination of whether any commands are already in the stack. If so, the process proceeds from block 280 to block 270, as described above and adds the current command to the stack and then proceeds to block 210 as described above. If it is determined in block 280 that there are no commands in the stack, the process proceeds from block 280, without adding the current command to the stack, to block 210 to wait for the input of another command. Thus, the stack will begin retaining subsequent commands only upon receipt of a START type command.

Returning to block 250, if it is determined that the conglomeration attribute associated in the active template with the voice recognition criteria component received is END, the process then proceeds from block 250 to block 290. In block 290, it is determined whether there are any commands in the conglomeration stack. If no, the process proceeds from block 290, without adding the current command to the stack, to block 210 to wait for the input of another command.

Returning to block 290, if it is determined that the stack does contain at least one command, the process proceeds from block 290 to block 300 and adds the current command to the stack. The process then proceeds to block 310 and defines the variable stack_pos as the position in the stack of the first command in the stack. The process then proceeds from block 310 to block 320 and forms a single complex command by concatenating all of the commands in the stack beginning at the position defined by the variable stack_pos and ending at the command placed in the stack in block 300. The variable conglom_cmd is then set to equal this newly formed single complex command. Conglom_cmd is a complex macro which contains all of the commands of the simpler macros contained in the stack, beginning with the START type command at the location stack_pos and ending with the END type command added to the stack in block 300.

The process next proceeds from block 320 to block 330 and accesses a conglomeration database. The conglomeration database is a temporary voice template of entries automatically constructed by the process so far, each with a current occurrence count. The process then proceeds to block 340 and determines whether the conglom_cmd macro created in block 320 is already registered in the conglomeration database. If not, the process proceeds from block 340 to block 360 and places the conglom_cmd macro into the conglomeration database with a counter or an occurrence count equal to one. The process then proceeds to block 370.

Returning to block 340, if the process determines that the conglom_cmd macro has already been registered in the conglomeration database, the process proceeds to block 350 and increments by one the counter or occurrence count of the conglom_cmd macro already in the database. The process then proceeds to block 370.

In block 370, the process determines whether the stack contains another command having a conglomeration attribute equal to START between the existing stack_pos and the existing END type command. In accordance with the invention, the process may place multiple START type commands into the stack before receiving an END type command. If yes, the process proceeds to block 380 and redefines the variable stack_pos as the stack position of the command nearest the former stack_pos having a conglomeration attribute equal to START. The process then proceeds from block 380 to block 320, as described above, and creates another conglom_cmd macro for processing in accordance with the flowchart as previously described.

Returning to block 370, if it is determined that the commands within the present conglom_cmd macro contain no further commands having a START conglomeration attribute, the process proceeds from block 370 to block 390 and empties the commands from the stack. The process then proceeds to block 210 and awaits another input command.

Turning next to FIG. 3, the process proceeds from block 220 of FIG. 2 to block 400 of FIG. 3 when it is determined in block 220 that the input command received is a disable request. In block 400, the process accesses a voice template for entries to be added to. This voice template may be an active template as referred to in FIG. 2 or it may be another voice template that is not presently active. The process may default to a specific template or allow the user to specify a template. The process then proceeds to block 410 and accesses the conglomeration database referred to in FIG. 2 beginning at block 330. The process then proceeds to block 420 and determines whether there are any macros in the conglomeration database. If no, the process terminates. If yes, the process proceeds from block 420 to block 430 and retrieves a conglomeration macro from the conglomeration database. The process then proceeds to block 440 and determines whether the occurrence count, or frequency of receipt, for the retrieved conglomeration macro is greater than a pre-defined threshold. If yes, the process proceeds from block 440 to block 450, creates a new voice template entry and places it into the template accessed in block 400. This new template entry includes the complex macro formed in block 320, which is a conglomeration of the simpler macros taken from the stack in FIG. 2. The new voice template entry also includes a voice recognition criteria component which is a conglomeration of the individual voice recognition criteria components of each of the commands conglomerated into the complex macro. The new template entry is assigned a default conglomeration attribute of NONE. The entry may also be assigned a comment string which is a conglomeration of all of the comment strings of the various commands conglomerated into the complex macro.

After the newly created entry is placed into the template in block 450, the process proceeds from block 450 to block 420, previously described, to determine whether there are any more entries in the conglomeration database. Similarly, returning to block 440, if the entry occurrence threshold is less than the predefined value, the process proceeds directly from block 440 to block 420 as described above.

Figure 4:
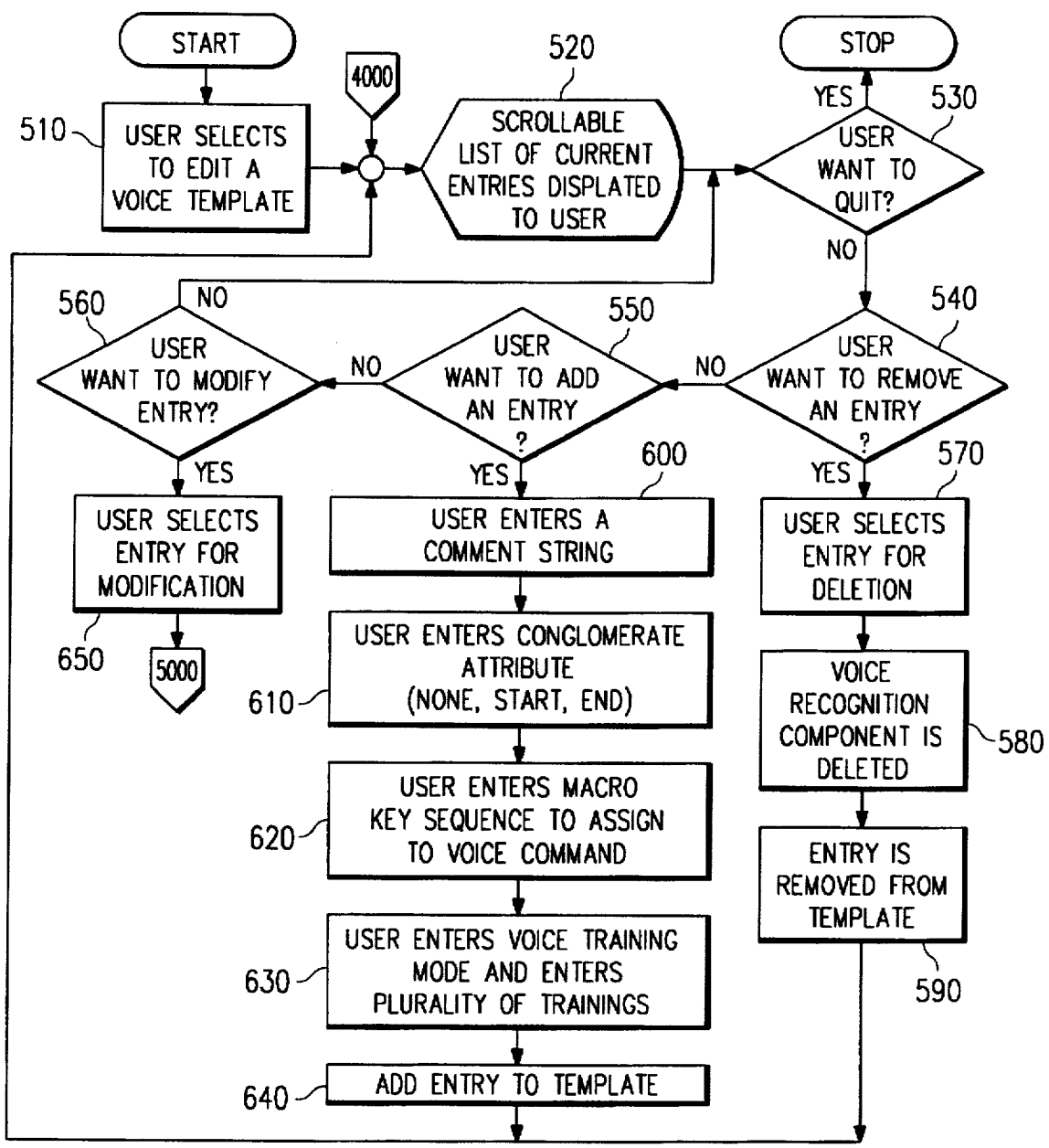
FIGS. 4–5 are a high level logic flowchart illustrating the method of a preferred embodiment for maintaining and modifying voice templates.
Figure 5:
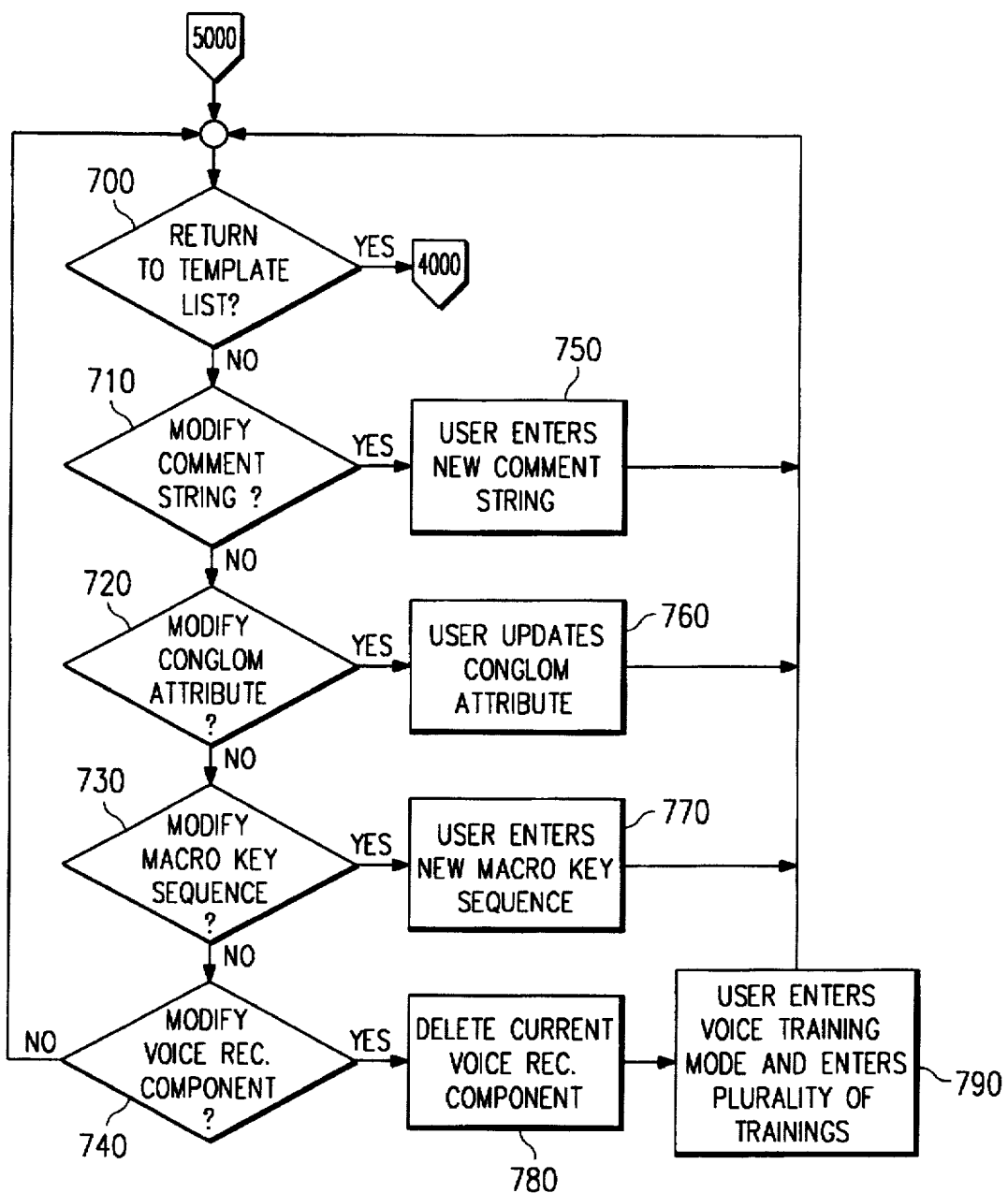

Turning next to FIGS. 4 and 5, there is depicted a high level logic flowchart which illustrates a method of editing the voice template into which the complex macros were placed in block 450 of FIG. 3. The illustrated method may be used to edit any template disclosed in accordance with this invention. Turning first to FIG. 4, the editing process begins at block 510 when the user selects to edit the voice template. The process then proceeds to block 520 and displays a scrollable list of current voice template entries to the user. The process then proceeds to block 530 and determines whether the user wishes to quit. If yes, the process terminates. If no, the process proceeds from block 530 to block 540.

In block 540, the process determines whether the user wishes to remove an entry from the voice template. If yes, the process proceeds from block 540 to block 570, in which the user selects an entry from the voice template for deletion. The process then proceeds to block 580 and the voice recognition criteria component associated with the entry is deleted from the voice template. The process then proceeds to block 590 and the entry, including the complex macro, the conglomeration attribute and the optional comment string are all removed from the template. The process then returns from block 590 to block 520 as described above.

Returning now to block 540, if the process determines that the user does not want to remove an entry, the process proceeds to block 550 and determines whether the user wants to add an entry to the template. If yes, the process proceeds from block 550 to block 600 where the user enters a comment string for the new entry. The process then proceeds to block 610 where the user enters a conglomeration attribute for the new entry or accepts the default conglomeration attribute of NONE. The process then proceeds to block 620 wherein the user enters a macro key sequence for the new entry. The process then proceeds to block 630 and enters the voice training mode so that the user may enter a plurality of trainings as may be required by the voice recognition capability of the data processing system. The process then proceeds from block 630 to block 640 and adds the newly created entry to the voice recognition template. The process then returns from block 640 to block 520, described above.

Returning now to block 550, if it is determined that the user does not want to add a new entry to the voice recognition template, the process proceeds from block 550 to block 560. In block 560 the process determines whether the user wishes to modify an existing entry in the voice recognition template. If no, the process proceed from block 560 to block 530, described above. The options offered to the user in blocks 530, 540, 550 and 560 may be offered to the user in any order or may be offered to the user simultaneously. If yes, the process proceeds from block 560 to block 650, and the user selects an entry from the voice template for modification. The process then proceeds to block 700 of FIG. 5.

Turning now to FIG. 5, in block 700, the process determines whether the user wishes to return to the template list. If yes, the process proceeds to block 520 of FIG. 4. If no, the process proceeds from block 700 to block 710 to determine whether the user wishes to modify the comment string of the entry selected for modification. If yes, the process proceeds to block 750 and allows the user to edit the existing comment string or enter a new comment string. The process then proceeds to block 700 as described above.

Returning now to block 710, if it is determined that the user does not wish to modify the comment string of the entry selected for modification, the process proceeds from block 710 to block 720 and determines whether the user wishes to modify the conglomeration attribute of the entry selected for modification. If yes, the process proceeds to block 760 and allows the user to update the conglomeration attribute. The process then proceeds from block 760 to block 700 as described above.

Returning to block 720, if it is determined that the user does not wish to modify the conglomeration attribute of the entry selected for modification, the process proceeds from block 720 to block 730, in which it is determined whether the user wishes to modify the macro key sequence of the entry selected for modification. If yes, the process proceeds from block 730 to block 770 and allows the user to enter a new macro key sequence or edit the existing macro key sequence. The process then proceeds from block 770 to block 700 as described above.

Returning now to block 730, if it is determined that the user does not wish to modify the macro key sequence of the entry selected for modification, the process proceeds from block 730 to block 740 for a determination of whether the user wishes to modify the voice recognition component of the entry selected for modification. If no, the process returns from block 740 to block 700 as described above. If yes, the process proceeds from block 740 to block 780 and deletes the current voice recognition component. The process then proceeds to block 790 and enters the voice training mode and allows the user to enter a plurality of voice trainings as may be required by the voice recognition capability of the data processing system. The process then returns from block 790 to block 700 as described above.

Figure 6:
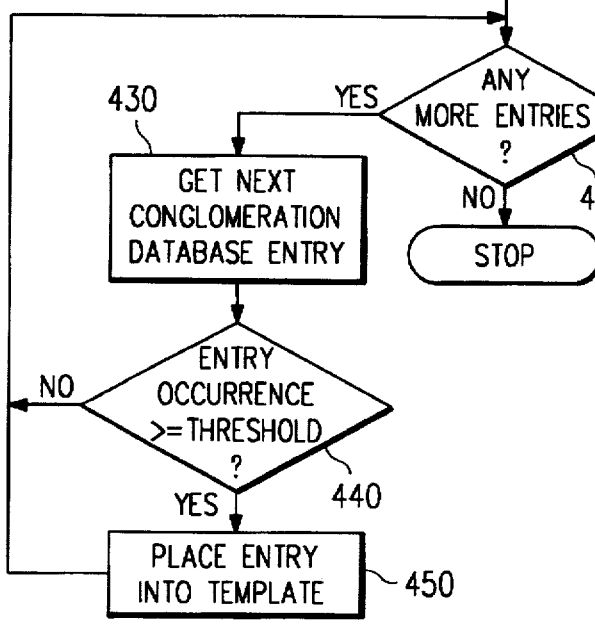
FIG. 6 is a high level logic flowchart illustrating the method of a preferred embodiment for defining a threshold.

Turning now to FIG. 6, there is depicted a high level flowchart which illustrates a method of defining a threshold. The threshold is preferably defined prior to the practice of the process illustrated in FIGS. 2 and 3, as the threshold is used by that process at block 440 of FIG. 2.

The process of FIG. 6 begins at block 810 with the user's definition of a threhold. A threshold is a frequency of occurrence that a sequence of commands must exceed for the process to assemble the sequence of commmands into a voice template entry. The threshold may be either an absolute number, such as 12 occurrences per session or 150 occurrences since installation of the application, or a frequency, such as 6 occurrences per 1000 commands received by the application. After the threshold is defined in block 810, the definition process terminates.

Upon reference to the foregoing, it will be appreciated that the applicants have provided a novel and useful method and apparatus for automatic creation of a voice recognition template entry. While the invention has been particularly shown and described with reference to a preferred embodiment and process, it will be understood that various changes in form and detail may be made therein without departing from the spirit and scope of the invention.

What is claimed is:

1. A method, performed in a data processing system, for the automatic creation of a voice recognition template entry, the method comprising the computer implemented steps of:

assembling a plurality of commands consecutively received by the data processing system into an assembled plurality of commands, at least one command of said assembled plurality of commands having a voice recognition criteria component associated therewith;

counting the occurrences of receipt, by the data processing system, of the assembled plurality of commands;

assembling the voice recognition criteria components associated with each command of said assembled plurality of commands into an assembled voice recognition criteria; and as a result of the occurrence count exceeding a predefined minimum, constructing a voice recognition template entry by associating the assembled voice recognition criteria components with the assembled plurality of commands.

2. The method of claim 1, wherein the computer implemented step of assembling a plurality of commands consecutively received by the data processing system includes the computer implemented step of concatenating the plurality of commands consecutively received by the data processing system.

3. The method of claim 1, wherein the computer implemented step of assembling voice recognition criteria components associated with the assembled plurality of commands includes the computer implemented step of concatenating voice recognition criteria components associated with the assembled plurality of commands.

4. The method of claim 1, wherein the computer implemented step of assembling a plurality of commands consecutively received by the data processing system includes the computer implemented step of assembling a plurality of commands consecutively received by the data processing system beginning with a command having a start conglomeration attribute and ending with a command having an end conglomeration attribute.

5. The method of claim 1, further comprising the computer implemented step of associating a conglomeration attribute with the assembled plurality of commands.

6. A data processing system for the automatic creation of a voice recognition template entry, comprising:

means for assembling a plurality of commands consecutively received by the data processing system into an assembled plurality of commands, at least one command of said plurality of commands having a voice recognition criteria component associated therewith;

means for counting the occurrences of receipt, by the data processing system, of the assembled plurality of commands;

means for assembling the voice recognition criteria components associated with each command of said plurality of commands into an assembled voice recognition criteria; and means for constructing, as a result of the occurrence count exceeding a predefined minimum, a voice recognition template entry by associating the assembled voice recognition criteria components with the assembled plurality of commands.

7. The data processing system of claim 6, wherein the means for assembling a plurality of commands consecutively received by the data processing system includes means for concatenating the plurality of commands consecutively received by the data processing system.

8. The data processing system of claim 6, wherein the means for assembling voice recognition criteria components associated with the assembled plurality of commands includes means for concatenating voice recognition criteria components associated with the assembled plurality of commands.

9. The data processing system of claim 6, wherein the means for assembling a plurality of commands consecutively received by the data processing system includes means for assembling a plurality of commands consecutively received by the data processing system beginning with a command having a start conglomeration attribute and ending with a command having an end conglomeration attribute.

10. The data processing system of claim 6, further comprising means for associating a conglomeration attribute with the assembled plurality of commands.

* * * * *